US011079966B2

(12) United States Patent
Compton et al.

(10) Patent No.: US 11,079,966 B2
(45) **Date of Patent: *Aug. 3, 2021**

(54) ENHANCED SOFT FENCE OF DEVICES

(71) Applicant: INTERNATIONAL BUSINESS MACHINES CORPORATION, Armonk, NY (US)

(72) Inventors: Scott B. Compton, Hyde Park, NY (US); Tariq Hanif, Lagrangeville, NY (US); Tri M. Hoang, Poughkeepsie, NY (US); Gregory E. McBride, Vail, AZ (US); Carol S. Mellgren, Tucson, AZ (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,408

(22) Filed: Sep. 3, 2019

(65) Prior Publication Data

US 2019/0384535 A1 Dec. 19, 2019

Related U.S. Application Data

(63) Continuation of application No. 15/897,693, filed on Feb. 15, 2018, now Pat. No. 10,437,517.

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0634* (2013.01); *G06F 3/0664* (2013.01)

(58) Field of Classification Search
CPC ...... G06F 3/0659; G06F 3/0604; G06F 3/067; G06F 3/0634; G06F 3/0664
USPC .......................................................... 711/154
See application file for complete search history.

(56) References Cited

U.S. PATENT DOCUMENTS

| | | | |
|---|---|---|---|
| 6,212,595 B1 | 4/2001 | Mendel | |
| 6,243,814 B1 | 6/2001 | Matena | |
| 7,055,059 B2 | 5/2006 | Yanai | |
| 7,085,956 B2 | 8/2006 | Petersen | |
| 7,124,265 B2 | 10/2006 | Nagasoe | |
| 7,653,682 B2 | 1/2010 | Erasani | |
| 7,778,157 B1 | 8/2010 | Tawri | |
| 7,949,636 B2 | 5/2011 | Akidau | |
| 9,052,833 B2 | 6/2015 | Petersen | |
| 2016/0328303 A1 | 11/2016 | Brandner | |
| 2017/0163726 A1* | 6/2017 | Compton | G06F 11/07 |

(Continued)

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Hua J Song
(74) *Attorney, Agent, or Firm* — L. Jeffrey Kelly

(57) ABSTRACT

A method, computer system, and a computer program product for soft fencing is provided. The present invention may include identifying a logical device swap occurred. The present invention may also include, in response to a logical device swap, creating a soft fence command. The present invention may then include issuing the created soft fence command.

20 Claims, 9 Drawing Sheets

500

Start

Issue Query Host Access to Volume (DSO Command) with Read Subsystem Data 502

Read IOS Record in Storage System Control Data Set (CDS) 504

Create a List of PGIDs in Production Sysplex 506

Identify PGIDs associated with Production Sysplex 508

Identify Sysplex Names Not in Production Sysplex or Recovery Sysplex 510

End

(56) References Cited

U.S. PATENT DOCUMENTS

| | | | |
|---|---|---|---|
| 2019/0243703 | A1 | 8/2019 | Rooney |
| 2019/0250849 | A1 | 8/2019 | Compton |

OTHER PUBLICATIONS

Rooney et al., "IBM TotalStorage Productivity Center for Replication for z/Os," IBM Systems Journal, 2008, p. 681-694, vol. 47, No. 4.

Rooney et al., "Swap Disk Failure for Continuous Availability," z/OS Hot Topics Newsletter, Aug. 2009, p. 62-63, Issue 21.

IBM: List of IBM Patents or Patent Applications Treated as Related (Appendix P), Sep. 25, 2019, 2 pages.

* cited by examiner

200

300

ENHANCED SOFT FENCE OF DEVICES

BACKGROUND

The present invention relates generally to the field of computing, and more particularly to storage replication. Replicating stored data allows for consistency among multiple resources such as storage devices. Various types of storage replication sessions exist. Active replication may replicate data at each host each time a user request is processed. Passive replication may replicate data at each host after one host processes the user request.

SUMMARY

Embodiments of the present invention disclose a method, computer system, and a computer program product for multi-target soft fencing. The present invention may include identifying a logical device swap occurred. The present invention may also include, in response to a logical device swap, creating a soft fence command. The present invention may then include issuing the created soft fence command.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
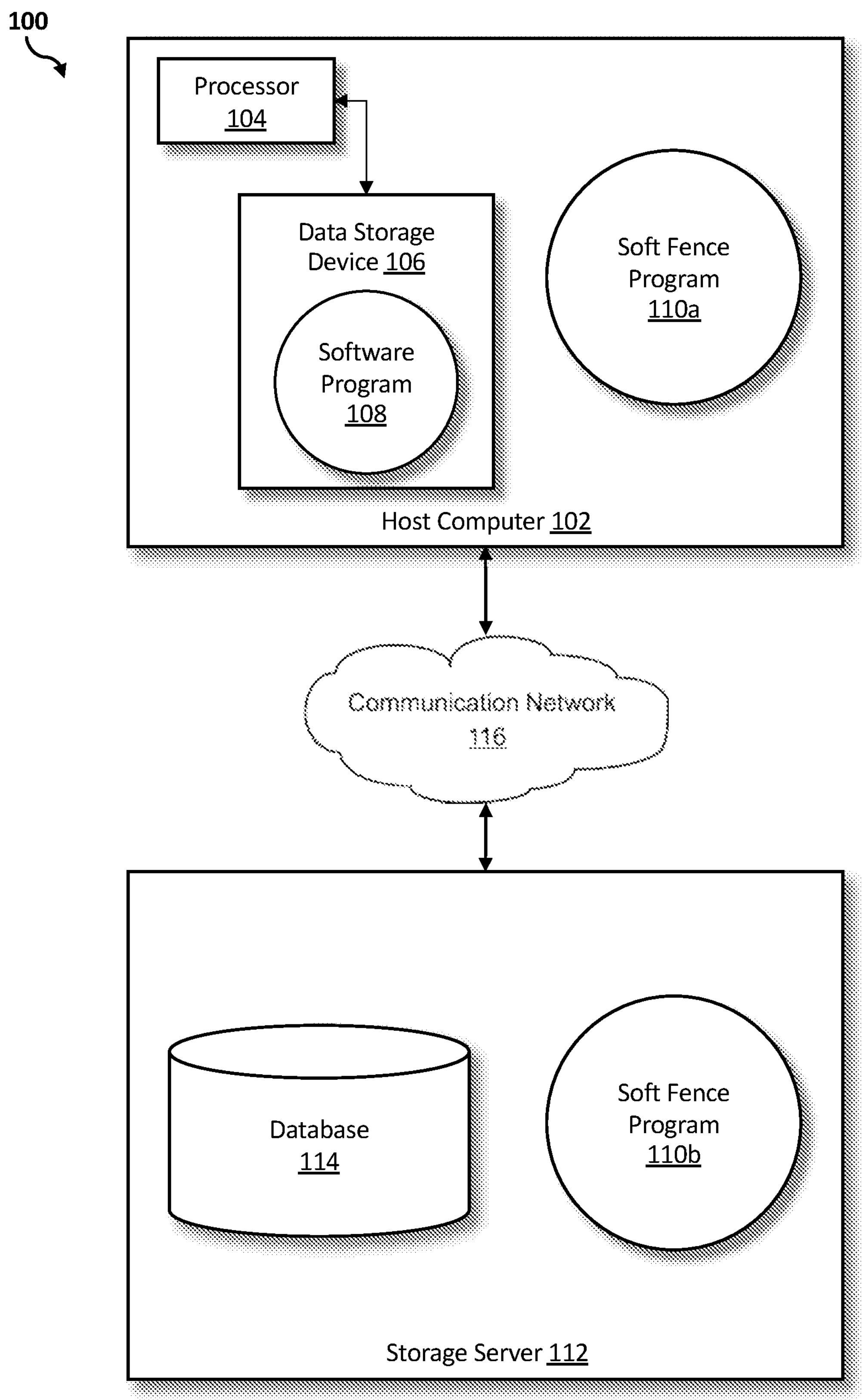
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for detecting an occurrence of a logical device swap. As such, the present embodiment has the capacity to improve the technical field of device swapping in a storage system environment by enabling various soft fence rules. More specifically, soft fence rules are enabled to restrict access to storage system volumes (i.e., storage system devices) such that certain hosts have limited access or no access to storage system volumes after a logical device swap has occurred.

As previously described, replicating stored data allows for consistency among multiple resources such as storage devices. Various types of storage replication sessions exist. Active replication may replicate data at each host each time a user request is processed. Passive replication may replicate data at each host after one host processes the user request.

A data replication system may, for example, include a host computer connected to an external storage system via a communication network, fibre optic cables or copper cables. An external computing system may also be known as a system, a host, a server or a processor. A storage server may also be known as a disk system, storage device, a primary storage system, a target storage system or a secondary storage system. A server may include a production server, a production system, a recovery server or a recovery system. The server may, for example, be connected to a primary storage server or a secondary storage server depending on the requirements of the disaster recovery environment. A sysplex may include a group or a cluster of host systems (i.e., a cluster of external storage systems).

Data replication may occur within one storage system, for example, Point-in-Time or FlashCopy® (FlashCopy and all FlashCopy-based trademarks and logos are trademarks or registered trademarks of International Business Machines Corporation and/or its affiliates) and the data may be copied at the same time. Sysplex may include Parallel Sysplex® (Parallel Sysplex and all Parallel Sysplex-based trademarks and logos are trademarks or registered trademarks of International Business Machines Corporation and/or its affiliates). Data replication may occur on more than one storage system and may include synchronous mirroring (e.g., Metro Mirror). Synchronous mirroring (i.e., replication) may copy data, for example, to both a primary storage system and a secondary storage system prior to the completion of the I/O request. Data replication may also occur across multiple storage systems and may include both synchronous and asynchronous mirroring (e.g., Multi-Target Metro Mirror/Global Mirror, Metro Global Mirror or Metro Mirror with z/OS Global Mirror). Asynchronous mirroring (i.e., replication) may complete an I/O request, for example when data is written to the primary storage system prior to copying the data to the secondary or target storage system.

Computing technology may use logical device swapping (e.g., a system switching from one storage system to another) that provides the host system with the ability to swap from a primary storage system to a synchronous mirror or primary storage. Logical device swapping may, for example, use HyperSwap® (HyperSwap and all HyperSwap-based trademarks and logos are trademarks or registered trademarks of International Business Machines Corporation and/or its affiliates) technology running on a host or a sysplex. A storage system may, for example be the IBM®

DS8000® (IBM DS8000 and all IBM DS8000-based trademarks and logos are trademarks or registered trademarks of International Business Machines Corporation and/or its affiliates). IBM z Systems® (IBM z Systems and all IBM z Systems-based trademarks and logos are trademarks or registered trademarks of International Business Machines Corporation and/or its affiliates) mainframe technology may also be used in conjunction with the IBM® DS8000®.

A synchronous mirror of storage devices may occur, for example, when a user writes to a disk. A primary storage device may send a copy of the user data to a secondary storage device. Once the secondary storage device replies back to the primary storage device with confirmation of the received copy, then the I/O may be completed. The primary and secondary storage may have the same data before completing the I/O operation. Logical device swapping when the primary storage and the secondary storage have identical data may allow the secondary to become the primary storage if the primary storage were to fail (e.g., the storage controller failing). Users may be moved from the primary storage device to the secondary storage device. Logical device swapping may also be used to ensure a host does not lose access to the host data volumes in a scenario where failure may occur, such as a loss of connectivity or a natural disaster.

An Active-Active type replication session may include a system at a primary site (i.e., host) actively processing work, such as transactions, when a secondary site may also be active (i.e., processing work, jobs, transactions or executions). An Active-Active environment may use a Multi-Target Metro Mirror (MT-MM) type of storage replication when two copies of data are being synchronously mirrored.

For example, an Active-Active HyperSwappable Session may include a system containing applications and multiple hosts (i.e., a sysplex) producing data logs such as IBM® DB2® (IBM DB2 and all IBM DB2-based trademarks and logos are trademarks or registered trademarks of International Business Machines Corporation and/or its affiliates). A primary storage system, H1 may copy data to a second storage system, H2. At the same time, H1 may copy all data or a subset of the data between H1 and a tertiary storage system, H3. H3 may be placed further away from H1 than H2 to provide an additional level of protection. Placing H3 further away from H1 than H2 makes H3 less likely to be impacted by, for example, a natural disaster that impacts both H1 and H2 if H1 and H2 reside in the same data center when H3 resides in a neighboring city.

H1 may represent a primary storage system that a set of production systems (i.e., hosts) may read or write from and H1 may include a set of data volumes or disk volumes. H2 may be a secondary storage system that is an identical copy of H1 and may reside at the same location as H1. H3 may also be an identical copy of H1, however, H3, may be located at an alternate location than H1 and H2. H1, H2, and H3 may each include a complete set of volumes (i.e., volumes needed to run a production system) and H1, H2, and H3 may be identical copies of each other. For example, the production system is running on H1 when H2 and H3 are being copied to. When mirroring (i.e., copying) is active, users may not read from H2 volumes and H3 volumes unless using a technology that allows the user to read from secondary (i.e., target) storage systems.

Once a logical device swap has been implemented, H2 and H3 are no longer target volumes (i.e., volumes being copied to) and all storage systems (i.e., H1, H2 and H3) may now be accessed. For example, if the HyperSwap from H1 to H2 is successful, the HyperSwap code immediately communicates to H1 to not allow reads or writes (i.e., is soft fenced) and communicates to all H3 volumes to not allow reads or writes (i.e., is soft fenced). H1 and H3 are soft fenced and may not be accessed.

The Active-Active environment may traditionally allow, for example, H3 to be accessed as a read-only storage system. If H1 fails, the system at the primary site may HyperSwap® to the H2 storage. Immediately after the HyperSwap®, the H1 and H3 volumes may no longer be Peer-to-Peer Remote Copy (PPRC) secondary volumes, which may create the possibility of an accidental Initial Program Load (IPL) (i.e., booting) off of H1 volumes and H3 volumes and not H2 volumes. An IPL may require manual correction if the primary site is not identified correctly or if the mirrored relationship is not restarted. Typically, to prevent the possibility of an accidental IPL, a HyperSwap® manager may normally issue a command to soft fence the former primary site (e.g., H1) volumes and the tertiary site (e.g., H3) volumes, however, if the H1 and H3 volumes are soft fenced, then the soft fence may cause input-output (I/O) requests from the recovery sysplex site to fail while attempting to read from the H3 volumes. This failure may impact the recovery sysplex site such that the recovery time now exceeds a threshold the recovery-time-objective (RTO) allows. A soft fenced state on a device may prevent I/O operations from being executed by the device disk subsystem, preventing unintended access to a device.

Logical device swapping technology incorporated soft fencing to prevent a user from accidentally IPLing a host off the wrong device. For example, once a system or sysplex (i.e., a host) is HyperSwapped from a primary storage system to a secondary storage system (i.e., a target), a user may need to IPL a system that may not have been active at the time of the HyperSwap to the secondary storage system, since the old source storage system is no longer the primary source. Soft fencing may be implemented after a logical device swap. Once the primary device (e.g., H1) is HyperSwapped with the secondary device (e.g., H2), the HyperSwap® manager may issue a soft fence command that puts the old data copy into a state such that no user may inadvertently IPL from the old primary device. The soft fence command may create a state on the primary device such that a user may not read from or write to the primary device.

Soft fencing operates cohesively when a mirroring relationship exists (e.g., synchronous mirroring or metro mirror) between a primary source and secondary source. A logical device swap may disassociate the mirroring relationship to use the secondary source as the primary source due to a primary source failure. After the logical device swap, if a soft fence is applied, no user may read from or write to the secondary source (i.e., the former primary source), however, without a soft fence, a user device may IPL hosts (e.g., production systems) from the former primary source which is no longer operating as such, leaving the user accessing the wrong copy of data. Soft fencing may present issues in an Active-Active environment, for example, when two target sources exist (e.g., H1 and H3). In the current example, after a logical device swap from the primary source (e.g., H1) to the target source (e.g., H2), a soft fence command may make the other target source (e.g., H3) inaccessible to the recovery system or sysplex in addition to making the old primary source (e.g., H1) inaccessible. The recovery system may need to maintain read access to the target source (e.g., H3), however, preventing an accidental IPL off of the other target source (e.g., H3) is desirable. Additionally, the recovery storage system may not be accessible since the soft fence rules are more stringent than rules for accessing a copy (i.e., by the recovery host system).

Therefore, it may be advantageous to, among other things, allow a logical device swapping manager to assure systems may not be IPLed from a storage system other than the currently active storage systems while concurrently allowing the recovery host system to have restricted or limited accessibility to a target storage system by providing new soft fencing methods.

According to at least one embodiment, a soft fence may allow systems to be identified as either having the ability to access volumes or to not access volumes. Identifying the systems may use the path-group identification (ID). When a logical device swapping event has been detected, soft fence commands may be issued to the old primary devices and to other target devices based on the failed primary device. The soft fence may be performed by issuing an I/O control command to indicate the device should be soft fenced.

A query host access to volume (e.g., a Define Subsystem Operation (DSO) command) with read subsystem data may return the sysplex name plus the unique path group identifier (PGID) of all systems that have established path groups to the device. IOS may have previously saved the PGID of each system within the sysplex in the IOS record in the sysplex couple data set (CDS). An enhanced soft fence program may determine which PGIDs are being used by other members of the sysplex and may determine which system name may be associated with the PGID.

The present embodiment may provide an indicator that may be set in the I/O control command. The indicator may be interpreted by the storage system as a new type of soft fence that may identify a list of systems. All systems on the list may be soft fenced and attempts to issue I/O requests (e.g., reads or writes) to a fenced device by these systems may be rejected by the storage system. The set indicator may allow logical device swapping to assure systems may not be IPLed from a storage system other than the currently active storage systems. At the same time, the set indicator may allow systems at the recovery site to continue to access a tertiary (e.g., H3) storage as read-only.

Fencing by a system may indicate differing types of soft fences, such as a full soft fence, a soft fence write only or no fencing. A full soft fence may prohibit both read and write requests. A soft fence write only may prohibit only write requests but may allow read requests. No fencing may allow both read and write requests.

Different types of soft fencing may allow certain storage replication commands to access the storage system, for example, starting and stopping mirroring. Soft fencing commands may include storage system level commands, for example, a Fibre Connection (FICON) command. When a storage system fails, the remaining host systems in the cluster (i.e., the sysplex) may swap to a new storage system and issue an already existing soft fence command to prevent other members of the sysplex from IPLing from the wrong storage system. A logical device swapping program such as HyperSwap® may allow systems outside of the sysplex to continue to access a copy of the data, even when the other systems are prevented from accessing the storage system. If a member of the sysplex becomes unresponsive, the host may be partitioned out of the sysplex. Upon a storage system failure, an affected host may be swapped completely from a primary storage system to a new storage system. Soft fence may be used to prevent access to a second copy of the original primary storage system that has neither failed nor been swapped to, however, the second copy may be a copy of the primary storage system and a storage system that may be accessed by another host in a read-only mode.

Identification of systems in the new soft fence command may either be accomplished using, for example, an inclusion list or an exclusion list. Identifying all of the systems accessing a storage system may occur since each system's PGID may be known while each system is connected. Systems outside of the storage system may be identified via other communication techniques (e.g., Transmission Control Protocol/Internet Protocol TCP/IP). PGIDs may be generated uniquely during system initialization.

Fencing at the granularity of a sysplex may occur when a storage system contains the sysplex name associated with each host PGID. Therefore, all systems on the list may be fenced using the sysplex name.

Fencing for systems other than sysplex members may be identified by all other trusted systems that may still have access to a storage system. For example, a single storage system (i.e., a host) or a list of storage systems may have access to a host.

According to an alternate embodiment, a read-only system may describe intent during set system characteristics I/O even if the read only system is soft fenced. During various online processing, indication would be made that if the device is soft fenced, then allow the system's I/O requests through to be executed. For example, the recovery system may issue both read and write I/O requests once the storage system is online.

Before a device may be used, the device may require prior validation. Prior validation may include bringing the device to an online state. During the online state sequence, an I/O control command may be issued to describe the operating mode. A system which may have, for example, a z Systems® (z Systems and all z Systems-based trademarks and logos are trademarks or registered trademarks of International Business Machines Corporation and/or its affiliates) I/O configuration specified by an input-output definition file (IODF) which may include a set of devices that may be accessed as read-only and may be described such that the intent of the I/O control command indicates the device may be accessed even if the device is soft fenced.

According to a second alternate embodiment, an I/O control command that may establish mirroring may set a new indicator to control access to volumes after the volumes are soft fenced. The control command may be used, for example, by a HyperSwap® manager to control access by indicating the volumes are accessible even if the volumes are soft-fenced. For example, when mirroring begins from one storage system to another storage system, a command called establish or a variation of the command may be used to indicate that the target volume may be read from a host system (e.g., a recovery sysplex).

According to a third alternate embodiment, a soft fence may allow read-only access to volumes, however, the soft fence may not allow write access to volumes. For example, a user may read from but not write to a storage system that has been soft fenced. When a logical device swapping event has been detected, soft fence commands typically are issued to the old primary devices and to other target devices based on the failed primary device. The soft fence may be performed by issuing an I/O control command to indicate the device should be soft fenced. In the third alternate embodiment, a new indicator may be set in the I/O control command that may be interpreted by the storage system as a new type of soft fence, such as a soft fence that is a write-only. Reads may be allowed, however write requests may be rejected by the storage system. Logical device swapping may assure that systems may not be IPLed from a storage system other than the currently active storage systems while, at the same time, allowing systems at the secondary site to continue to access the tertiary (e.g., H3) storage as read-only.

According to a fourth alternate embodiment, existing soft fence rules may be relaxed so that read-only would be allowed without regard to a device's fenced state, provided that the read I/O request may be encountered with the prefix designation of read through a secondary state or a suspended state. A prefix command indicator may be used to indicate a read-only intent to a secondary device. The fourth alternate embodiment may alter the behavior of the soft fence so that if a user had a prefix command that, for example, indicated the user is doing a read, the user is consciously deciding to read from a soft fenced volume (i.e., a soft fenced storage system) and read-only would be allowed.

Referring to FIG. 1, an exemplary networked computer environment 100 in accordance with one embodiment is depicted. The networked computer environment 100 may include a host computer 102 with a processor 104 and a data storage device 106 that is enabled to run a software program 108 and a soft fence program 110*a*. The networked computer environment 100 may also include a storage server 112 that is enabled to run a soft fence program 110*b* that may interact with a database 114 and a communication network 116. The networked computer environment 100 may include a plurality of computers 102 and storage servers 112, only one of which is shown. The communication network 116 may include various types of communication networks, such as a fiber channel network, a storage area network (SAN), a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client host computer 102 may communicate with the storage server computer 112 via the communications network 116. The communications network 116 may include connections, such as wire, wireless communication links, or fiber optic cables. As will be discussed with reference to FIG. 7, server computer 112 may include internal components 902*a* and external components 904*a*, respectively, or a server computer 112 may include internal components 902*a* only. A client host computer 102 may include internal components 902*b* and external components 904*b*, respectively. Server computer 112 may also operate in a cloud computing service model, such as Software as a Service (SaaS), Analytics as a Service (AaaS), Platform as a Service (PaaS), or Infrastructure as a Service (IaaS). Storage server 112 may also be located in a cloud computing deployment model, such as a private cloud, community cloud, public cloud, or hybrid cloud. Client host computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the soft fence program 110*a*, 110*b* may interact with a database 114 that may be embedded in various storage devices, such as, but not limited to a computer/mobile device 102, a networked storage server 112, or a cloud storage service.

According to the present embodiment, a user using a host computer 102 or a server computer 112 may use the soft fence program 110*a*, 110*b* (respectively) to allow soft fence systems to be identified as either having the ability to access volumes or to not access volumes. The soft fence method is explained in more detail below with respect to FIGS. 2-6.

Figure 2:
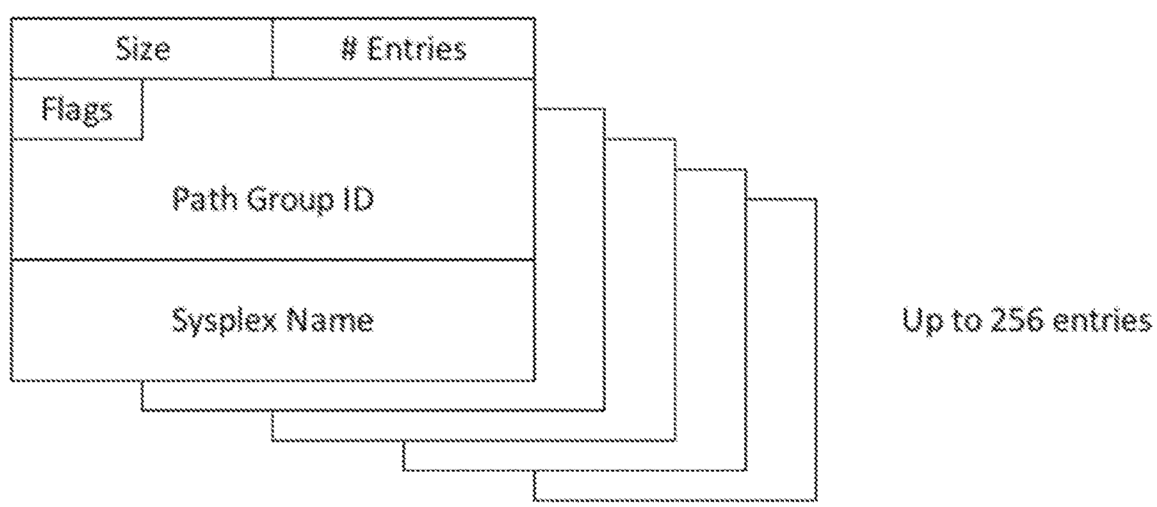
FIG. 2 is a block diagram example of the output of the query host access volume command according to at least one embodiment.

Referring now to FIG. 2, a block diagram example of the query host access volume command 200 input issued by the soft fence program 110*a*, 110*b* according to at least one embodiment is depicted. A query host access volume may include the size of the control block and the number of path group identification (ID) entries. Each path group ID entry may include flags, a 15-byte path group ID and an 8-bytes sysplex name.

Figure 3:
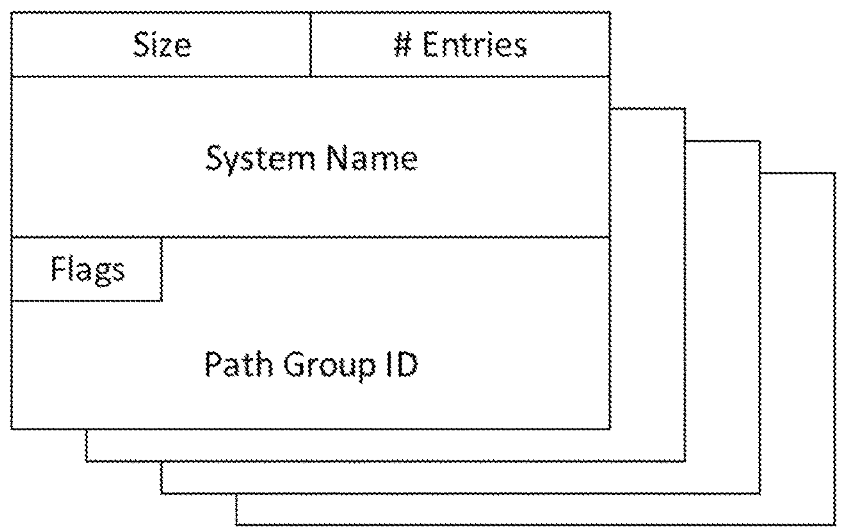
FIG. 3 is a block diagram example of an input-output services (IOS) couple data set (CDS) record according to at least one embodiment.

Referring now to FIG. 3, a block diagram example of an IOS couple data set (CDS) record 300 used by the soft fence program 110*a*, 110*b* according to at least one embodiment is depicted. The IOS couple dataset record may contain a size of the control block and a number of system entries. Each system entry may, for example, contain a system name, flags, and a 15-byte path group ID associated with the system.

Figure 4:
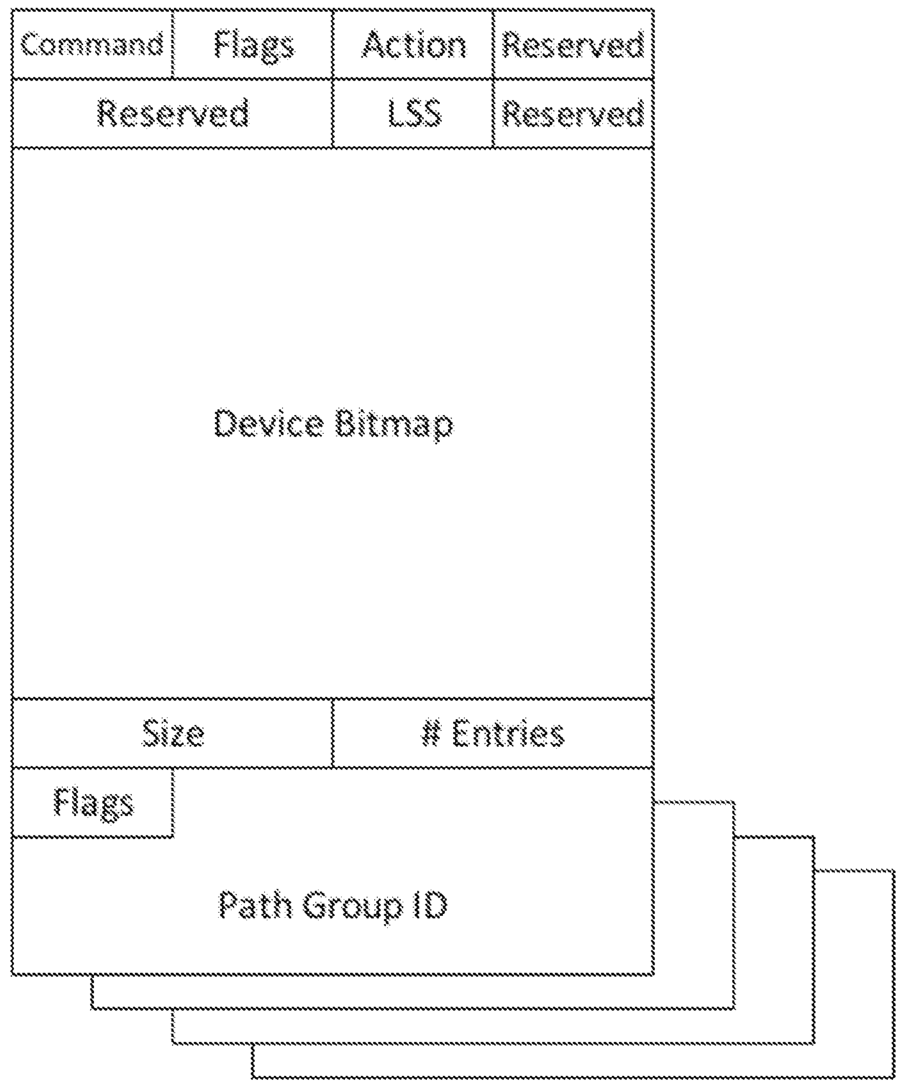
FIG. 4 is a block diagram example of a soft fence command according to at least one embodiment.

Referring now to FIG. 4, a block diagram example of a soft fence command 400 used by the soft fence program 110*a*, 110*b* according to at least one embodiment is depicted. The soft fence command input may include a command code that identifies the command as a soft fence, identifies the targeted logical subsystem (LSS) and identifies a device (i.e., unit address) bitmap. The device bitmap may indicate the devices within the LSS that are to be soft fenced. For example, bit 0 represents device 0 through bit 255, which represents device 255. The soft fence command 400 may also include an array of path group IDs targeted by the soft fence command. The array of path group IDs may include a size of the array, a header, a count of the number of array entries and an array of path group IDs. Flags may be included for each of the path group ID entries in the array.

Figure 5:
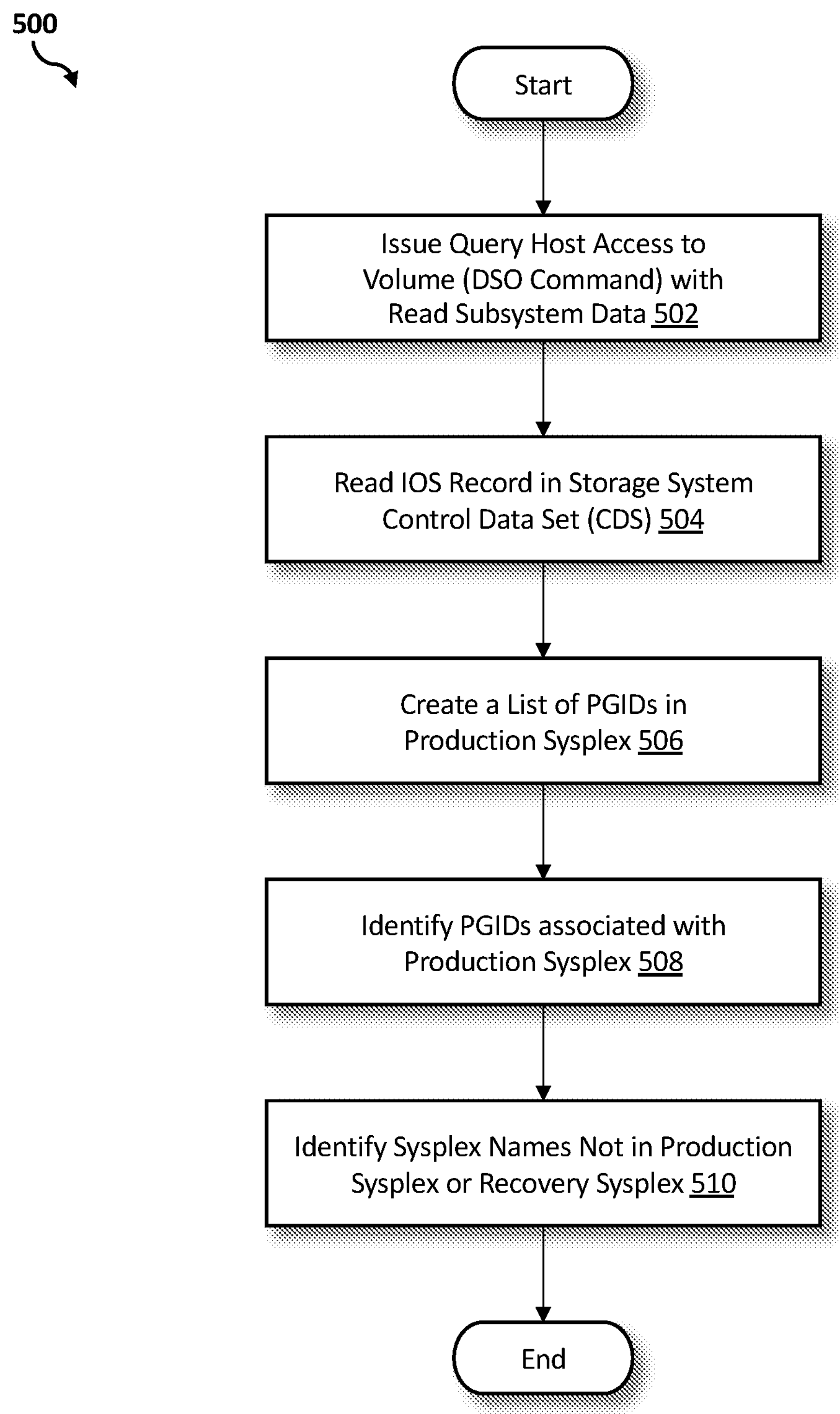
FIG. 5 is an operational flowchart illustrating a process for logical device swap load processing according to at least one embodiment.

Referring now to FIG. 5, an operational flowchart illustrating the exemplary logical device swap load process 500 used by the soft fence program 110*a*, 110*b* to gather all of the information that may be required in the event that a soft fence may need to be issued as part of a HyperSwap according to at least one embodiment is depicted.

At 502, query host access to volume (DSO command) with read subsystem data is issued. The query may return the storage system name and the unique PGID of each host that has established path groups to the device.

Then, at 504, the IOS record in the storage system control data set (CDS) is read. The read CDS may include a host system name of each host system or member of the sysplex and the associated PGID. The IOS CDS may contain the name and associated PGID of each host system in the sysplex and may only include members of the sysplex.

Next, at 506, a list of PGIDs in the production sysplex is created. The list of PGIDs is created using the names of all of the systems in the sysplex identified at step 504. Each PGID may be associated with each system in the production sysplex. The PGIDs may be used when soft fencing each system for reads or writes.

At 508, the PGIDs associated with the production sysplex are identified. Using the names of the recovery sysplex, all of the PGIDs in the sysplex are associated using the output of the query host access to volume issued in step 502. The associated PGIDs may be used to soft fence all of the systems for write only (i.e., reads may be allowed).

An alternate embodiment may allow the PGID of a single member of the recovery sysplex to be used to limit the scope of the read access to the single member. The production sysplex may obtain the name of the recovery sysplex using various methods. Additionally, the PGID of the single member of the recovery sysplex may be obtained using various methods. For example, a customer defines the name of the recovery sysplex in a configuration file or alternatively the PGID is sent from the recovery sysplex over TCP/IP.

Then, at 510, sysplex names not in the production sysplex and not in the recovery sysplex are identified. Identifying sysplex names that are either not on the production sysplex or not on the recovery sysplex may be accomplished by using the names of the sysplexes returned by the query host access to volume in step 502. The compiled sysplex name data may allow the soft fence program 110*a*, 110*b* to determine PGIDs associated with other sysplexes (i.e., sysplexes other than the production sysplex and the recovery sysplex). The compiled sysplex name data may be used to soft fence specific systems for read functions and write functions.

Figure 6:
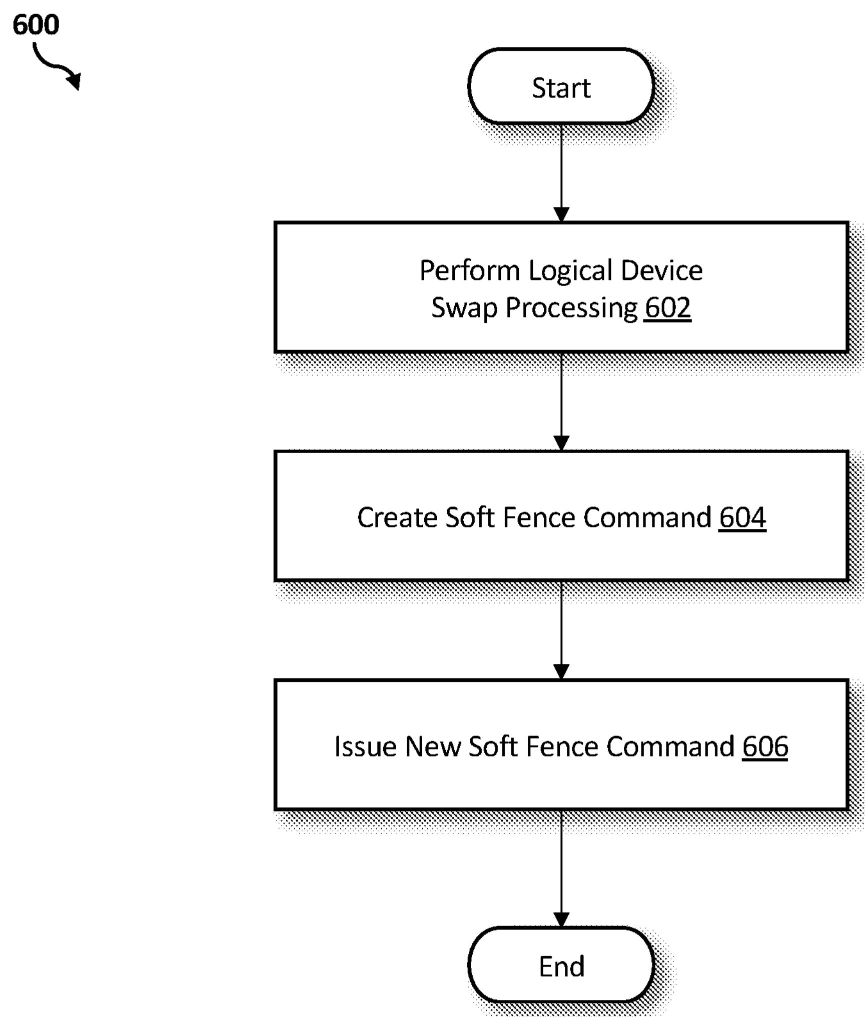
FIG. 6 is an operational flowchart illustrating a process initiated upon the detection of a logical device swap trigger according to at least one embodiment.

Referring now to FIG. 6, an operational flowchart is depicted illustrating the exemplary processing of a logical swap 600 upon detection of a logical device swap trigger, including the new soft fence process used by the soft fence program 110*a*, 110*b* according to at least one embodiment.

At 602, the current logical device swap processing is performed. Logical device swapping is a known process. For example, processing a logical device swap on a z/OS performs a swap going through a series of steps, which may include verifying that the systems involved in the swap still have access to the target copies, and freezing and quiescing I/O requests to the primary devices. The process may then issue a failover command to all of the secondary devices to make them available for I/O requests. Another step may include swapping information in internal control blocks (i.e., unit control blocks (UCBs)) so that all I/O requests to the old primary will now go to the new primary (i.e., old target). Additionally, the process may resume the I/O request to allow programs to continue with the program I/O requests. Another step may include soft fencing the old primary devices to prevent accidental access and unfreezing old primary devices. Additional cleanup processing may also occur, such as binding parallel access volume (PAV) aliases.

Then, at 604, a soft fence command is created. For each LSS that is HyperSwap managed, at least one soft fence command will be created, for example, for the old primary storage system and, in a multi-target storage environment, a soft fence command will also be created for the secondary storage system. The soft fence command may include the LSS and a device bitmap that indicates each of the HyperSwap managed devices within the LSS that are to be soft fenced. The soft fence command may also indicate the type of soft fence (i.e., read or write) in the action field. The list may specify which host system may be read and write fenced or write fenced by specifying the PGID. Systems in the production sysplex may be read and write fenced, while the recovery host system may be write fenced. The PGIDs of other host systems that are not a member of the production sysplex or the recovery sysplex may be both read and write fenced (i.e., not able to access the sysplex).

At 606, the new soft fence command is issued. For each LSS that is HyperSwap managed, at least one soft fence command will be created. The new soft fence command may be issued to the old primary storage system (e.g., H1) and the secondary storage system (e.g., H3) in, for example, a multi-target session. The new soft fence command may specify a new indicator (e.g., bit) identifying the new command to be fenced.

It may be appreciated that FIGS. 2-6 provide only an illustration of one embodiment and do not imply any limitations with regard to how different embodiments may be implemented. Many modifications to the depicted embodiment(s) may be made based on design and implementation requirements.

Figure 7:
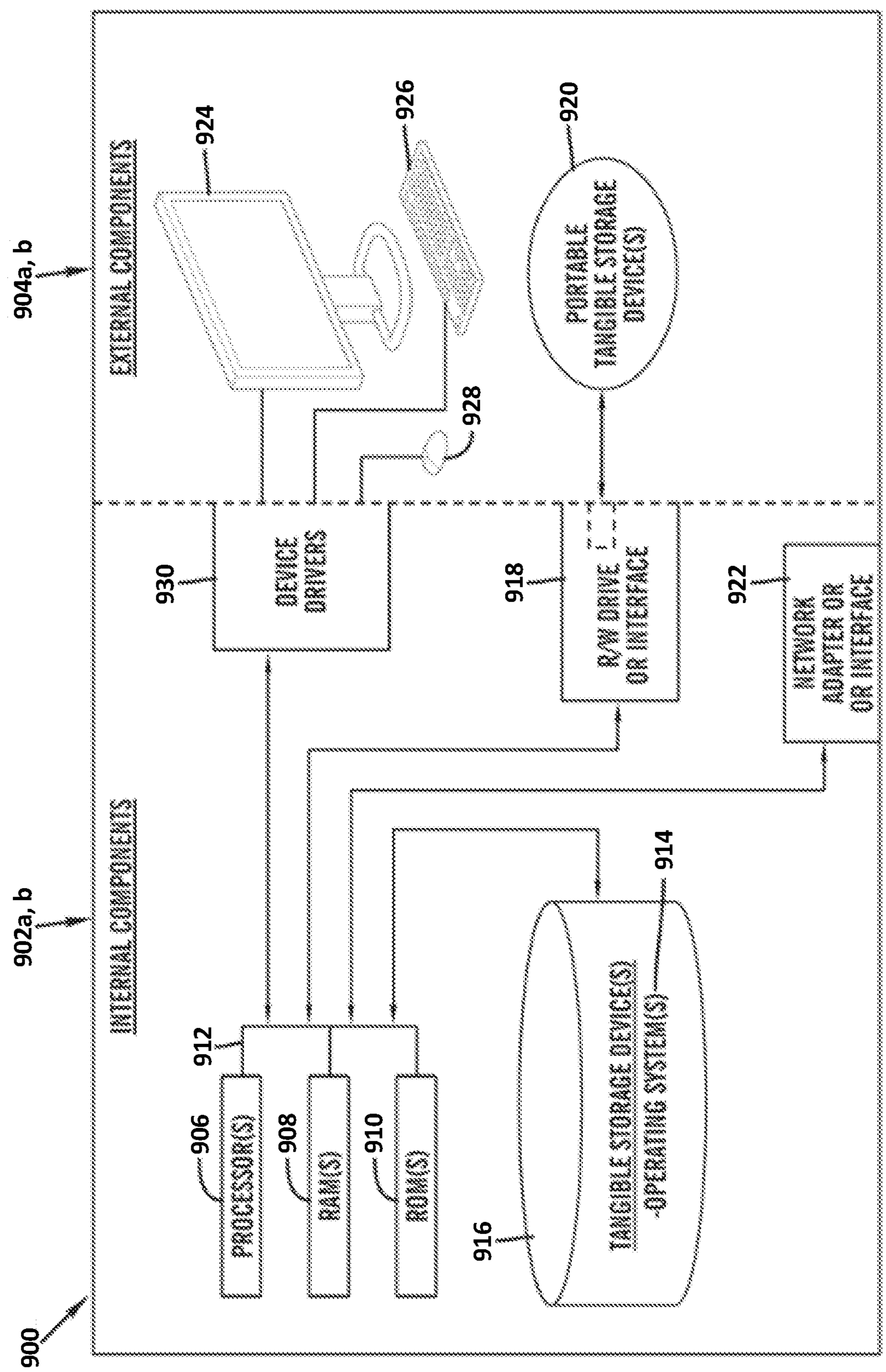
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client host computer 102 and network storage server 112 may include respective sets of internal components 902 *a, b* and external components 904 *a, b* illustrated in FIG. 7. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the soft fence program 110*a* in client host computer 102, and the soft fence program 110*b* in network storage server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive or may be an external hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more computer-readable tangible storage devices 920 such as a CD-ROM, DVD, memory stick, magnetic tape, magnetic disk, optical disk or semiconductor storage device. A software program, such as the software program 108 and the soft fence program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the soft fence program 110*a* in client host computer 102 and the soft fence program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the soft fence program 110*a* in client host computer 102 and the soft fence program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
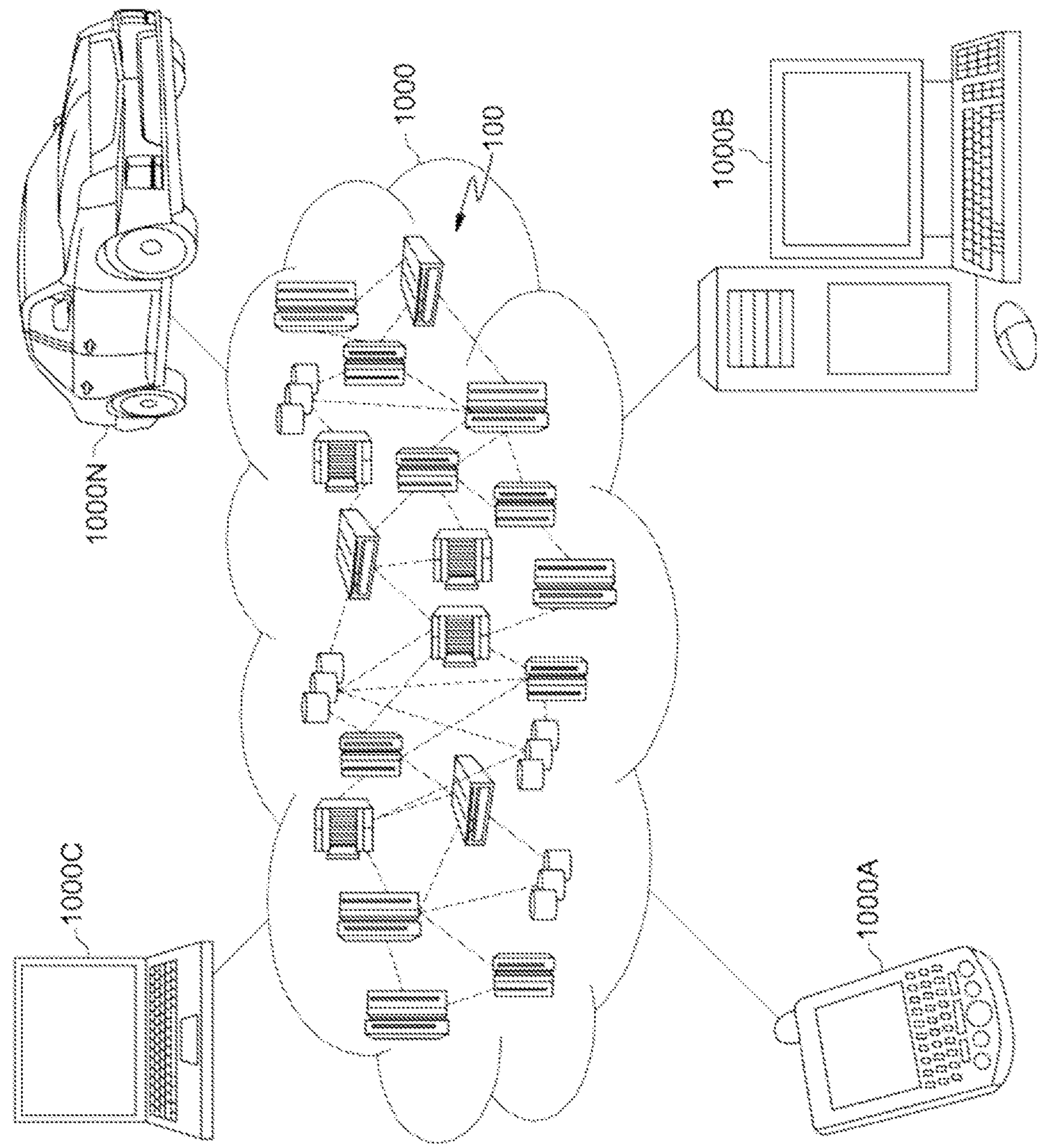
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
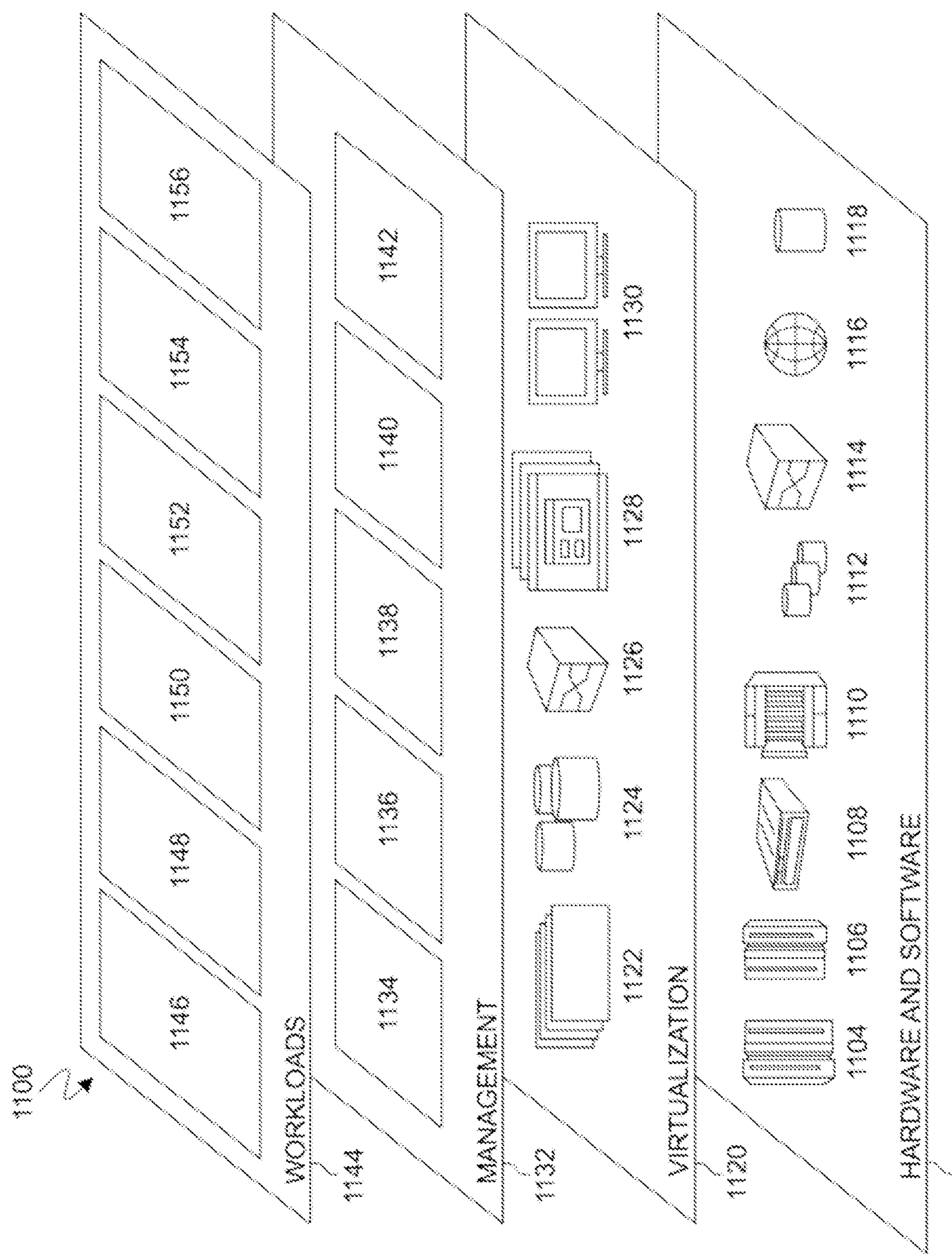
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128 (e.g., HyperSwap and soft fence functions used with storage devices 1112); and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and logical device swap detection 1156.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for soft fencing, the method comprising:

processing an input-output services (IOS) record in a storage system control data set (CDS);

creating a list of path group identifiers (PGIDs);

identifying the created list of PGIDs associated with a production sysplex;

associating the identified list of PGIDs with the production sysplex;

identifying a plurality of sysplex names not associated with the production sysplex;

identifying a logical device swap occurred; and in response to the logical device swap, creating a soft fence command.

2. The method of claim 1, further comprises:

issuing the soft fence command.

3. The method of claim 1, wherein the soft fence command includes a logical subsystem (LSS) command, a device bitmap and an action field.

4. The method of claim 1, further comprising:

identifying a plurality of logical device swaps occurred;

in response to the plurality of logical device swaps, creating a soft fence command for each logical device swap; and issuing the new created soft fence commands.

5. The method of claim 1, wherein the soft fence command is a read fence, a write fence or a read and write fence.

6. The method of claim 2, wherein the list of PGIDs specifies which system is a read fenced system, a write fenced system or a read fenced and write fenced system.

7. The method of claim 3, wherein the action field includes a type of the soft fence command issued.

8. A computer system for soft fencing, comprising:

one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

processing an input-output services (IOS) record in a storage system control data set (CDS);

creating a list of path group identifiers (PGIDs);

identifying the created list of PGIDs associated with a production sysplex;

associating the identified list of PGIDs with the production sysplex;

identifying a plurality of sysplex names not associated with the production sysplex;

identifying a logical device swap occurred; and in response to the logical device swap, creating a soft fence command.

9. The computer system of claim 8, further comprises:

issuing the soft fence command.

10. The computer system of claim 8, wherein the soft fence command includes a logical subsystem (LSS) command, a device bitmap and an action field.

11. The computer system of claim 8, further comprising:

identifying a plurality of logical device swaps occurred;

in response to the plurality of logical device swaps, creating a soft fence command for each logical device swap; and issuing the new created soft fence commands.

12. The computer system of claim 8, wherein the soft fence command is a read fence, a write fence or a read and write fence.

13. The computer system of claim 9, wherein the list of PGIDs specifies which system is a read fenced system, a write fenced system or a read fenced and write fenced system.

14. The computer system of claim 10, wherein the action field includes a type of the soft fence command issued.

15. A computer program product for soft fencing, comprising:

one or more computer-readable tangible storage media and program instructions stored on at least one of the one or more computer-readable tangible storage media, the program instructions executable by a processor to cause the processor to perform a method comprising:

processing an input-output services (IOS) record in a storage system control data set (CDS);

creating a list of path group identifiers (PGIDs);

identifying the created list of PGIDs associated with a production sysplex;

associating the identified list of PGIDs with the production sysplex;

identifying a plurality of sysplex names not associated with the production sysplex;

identifying a logical device swap occurred; and in response to the logical device swap, creating a soft fence command.

16. The computer program product of claim 15, further comprises:

issuing the soft fence command.

17. The computer program product of claim 15, wherein the soft fence command includes a logical subsystem (LSS) command, a device bitmap and an action field.

18. The computer program product of claim 15, further comprising:

identifying a plurality of logical device swaps occurred;

in response to the plurality of logical device swaps, creating a soft fence command for each logical device swap; and issuing the new created soft fence commands.

19. The computer program product of claim 15, wherein the soft fence command is a read fence, a write fence or a read and write fence.

20. The computer program product of claim 16, wherein the list of PGIDs specifies which system is a read fenced system, a write fenced system or a read fenced and write fenced system.

* * * * *